United States Patent
Ueda et al.

(10) Patent No.: US 6,733,182 B2
(45) Date of Patent: May 11, 2004

(54) ROLLING BEARING

(75) Inventors: Kiyotoshi Ueda, Kanagawa (JP); Yukio Ohura, Kanagawa (JP); Susumu Tanaka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/983,914

(22) Filed: Oct. 26, 2001

(65) Prior Publication Data

US 2002/0061150 A1 May 23, 2002

(30) Foreign Application Priority Data

Nov. 22, 2000 (JP) ........................................ 2000-356211

(51) Int. Cl.$^7$ ............................................... F16C 19/06
(52) U.S. Cl. ...................................... 384/492; 384/625
(58) Field of Search ................................. 384/492, 625, 384/912, 913, 565, 569

(56) References Cited

U.S. PATENT DOCUMENTS 6,086,686 A * 7/2000 Tanaka et al. .............. 384/492

FOREIGN PATENT DOCUMENTS

| DE | 44 19 035 A1 | 12/1994 | |
|---|---|---|---|
| DE | 44 11 795 A1 | 12/1995 | |
| DE | 197 07 033 A1 | 11/1997 | |
| DE | 695 09 733 T2 | 12/1999 | |
| DE | 199 50 813 A1 | 5/2000 | |
| JP | 8-9766 | 1/1996 | ............. C23C/8/26 |
| JP | 10-131970 | 5/1998 | ........... F16C/33/58 |
| JP | 11-80923 | 3/1999 | ............. C23C/8/26 |
| WO | 98/44270 | 8/1998 | ........... F16C/33/32 |

OTHER PUBLICATIONS

German Leaflet 447 "Nitrieren", Beratungsstelle fur Stahlverwendung Dusseldorf, 1974, Chapter 2.2.
Documentation from NASA, LeRC Home Page. vol. 1.
S. Gill, European Space Tribology Laboratory, "Liquid Lubricants in Space" Jun. 8$^{th}$ & 9$^{th}$ 1994.
Japanese Abstract, 11–080923, Mar. 26, 1999.
Japanese Abstract, 03–044457, Feb. 26, 1991.
Japanese Abstract, 10–131970, May 22, 1998.
European Abstract, 0 971 141 A1 Feb. 4, 1998.

* cited by examiner

*Primary Examiner*—Lenard A. Footland
(74) *Attorney, Agent, or Firm*—Sughrue Mion, PLLC

(57) ABSTRACT

To provide a rolling bearing for a man-made satellite which is free from the damages, e.g., formation of the band mark on the surfaces of the rolling elements, and the losing of the luster of the surfaces thereof. There is provided a rolling bearing, which is used mainly for a man-made satellite, includes an outer ring, an inner ring, and rolling elements. The parent material of those components is martensitic stainless steel. Of those components, at least the rolling elements are processed to have nitride surface layers formed over their surfaces. A hardness of the nitride surface layer is Hv1200 to 1500.

8 Claims, 1 Drawing Sheet

ROLLING BEARING

BACKGROUND OF THE INVENTION

The present invention relates to rolling bearing well adaptable for the supporting of a fly wheel used for the attitude control of a man-made satellite.

As a conventional technique for controlling an attitude of a man-made satellite is such a manner that a fly wheel is installed on the satellite, an angular rate of rotation of the fly wheel is varied to apply a reaction torque to the satellite. In the controlling of the satellite attitude, a rolling bearing for supporting the fly wheel, which has been used, is a preloaded combination angular ball bearing, for example. For the fly-wheel support rolling bearings at the satellite attitude control, the following items are required: good durability and less dust generation under vacuum condition, low torque, little torque variation, long lifetime, and the like. To satisfy those required items, it is required that the lubricant oil is stably supplied to the rolling bearing while keeping the least amount of lubricant oil.

In this type of rolling bearing, for a fixed period of time continued till an external lubricant oil source starts to supply lubricant oil to the rolling bearing, it is lubricated with a slight amount of lubricant oil coated over the raceway surfaces of the inner and outer rings, and also with the lubricant oil impregnated into the retainer.

As described above, the rolling bearing is lubricated with a slight amount of lubricant oil till the external lubricant oil source starts to supply lubricant oil to the rolling bearing. During this period, an undesired phenomenon sometimes occurs: a band mark (band wear) appears on the surface of the ball (rolling element) or the luster of the ball surface is lost. A major cause of the band mark is slip between the balls and the inner and outer raceway surfaces in a state that those are insufficiently lubricated. It is difficult to avoid those damages by merely removing foreign materials or improving washing work.

The word, "damage", means a damage of the ball to such an extent that the band mark and the losing of the luster, which are formed on the ball surface, can be perceived by the eye, but a degree of wearing is extremely small, and the wear is barely recognized in the surface roughness. However, for a long working, the wear of such a degree will grow under a special circumstance, such as, in the outer space, and consequently the rolling bearing will lose its function.

SUMMARY OF THE INVENTION

Accordingly, an object of the present invention is to provide a rolling bearing for a man-made satellite, which is free from the damages, e.g., formation of the band mark on the surfaces of the rolling elements, and the losing of the luster of the surfaces thereof.

Much effort has been made to find the way to prevent the surface damage of the rolling elements in the special conditions of the outer space in a manner that a proper modified layer is formed on the surface of a component part of the rolling bearing while utilizing the basic characteristic of steel as intact. The inventors reached the following technical idea to prevent the surface damage.

The technical idea is implemented in the form of a rolling bearing in use for a man-made satellite. The rolling bearing comprises an inner ring having an inner raceway surface, an outer ring having an outer raceway surface, and a rolling element rotatably disposed between the outer raceway surface and the inner raceway surface, wherein the inner and outer rings, and the rolling element are made of martensitic stainless steel as the parent material, the rolling element includes a nitride surface layer that has a hardness of Hv1200 to 1500.

In particular, in the above-mentioned structure it is advantageous that a surface roughness of the nitride surface layer is 0.1 μmRa or less.

In particular, in the above-mentioned structure it is advantageous that a thickness of the nitride surface layer is 3 μm or greater and 2% DA or less, where 2% DA represents 2% of the diameter of the rolling element.

In particular, in the above-mentioned structure it is advantageous that the martensitic stainless steel consists of AISI 440C, a longitudinal elastic modulus of the AISI 440C is 200 GPa, and a longitudinal elastic modulus of the nitride layer is 240 GPa.

In particular, in the above-mentioned structure it is advantageous that a uniformity thickness of the nitride surface layer is preferably within 5 μm.

Furthermore, in the above-mentioned structure it is advantageous that at least one of said inner and outer raceway surfaces also include said nitride surface layer.

In the above constructed rolling bearing, even if the oil films among the inner and outer rings, and the rolling elements reduce in their thickness with progress of the operation of the rolling bearing, and the surfaces of those are brought into contact with one another, at least the surfaces of the rolling elements are not damaged since the Vickers hardness of those elements are set at 1200 to 1500 (Hv=1200 to 1500). A longitudinal elastic modulus of the nitride surface layer is larger than that of the martensitic stainless steel. Therefore, a contact ellipse is extremely small, and no slip occurs. As a result, there is no chance that a band mark is formed on the rolling elements.

The rolling bearing of the invention is assembled into rotary parts of the man-made satellite. Examples of the rotary parts of the man-made satellite are the fly wheel, the paddle developing mechanism of a solar battery, the antenna developing mechanism, the actuators of the docking mechanism, manipulators of the robot arms, radiation meter, and switches.

Examples of the process of forming a nitride surface layer (having a proper nitrogen concentration and a proper hardness) are liquid nitriding process using a salt bath, gas nitriding process, and ion nitriding process.

Of those processes, the ion nitriding process has a relatively high process temperature. Accordingly, it is difficult to secure a satisfactory hardness of the substrate even if the heat resistance of the parent material is taken into consideration. Sometimes, it is difficult to form a uniform nitride surface layer over the surface of the spherical object. For this reason, it is preferable to use the salt bath nitriding process or the gas nitriding process. Incidentally, 480° C. or lower is preferable for the nitriding process temperature.

In particular when the process temperature is high, a compound fragile layer of several μm (pseudo ceramic layer of ξ phase or a single ε phase) is often formed like a film on the outermost surface of the nitride layer. To avoid this, the nitriding process temperature is more preferably 460° C. or lower. At such a low process temperature, the nitride surface layer is more densely and is free from the formation of bad porous layers.

A great amount of one or more nitrides of those ξ phase ($Fe_2N$), ε phase ($Fe_{2-3}N$), γ' phase ($Fe_4N$), CrN and $Cr_2N$ separate out into the martensite, whereby forming the nitride surface layer of the invention. Accordingly, the nitride surface layer is extremely hard and tough. Those properties of the nitride surface layer greatly suppresses the damaging of the rolling element.

Further, since the parent material is martensitic stainless steel, the substrate has a satisfactory hardness of about HRC57 to 59 even under the nitriding process conditions.

Preferably, the rolling elements having the nitride surface layers formed thereon are subsequently subjected to a finishing process, and its surface roughness is 0.1 μmRa or less. By so done, the nitride surface layer of the rolling element will come in contact with its counterpart with less impact.

A method of manufacturing rolling elements will be described hereunder.

To start, stock balls are formed using a wire formed by cold drawing, by cold or cutting process and flushing by the header. The formed stock balls are quenched, and tempered, and if necessary, is also subjected to sub-zero process, whereby it is hardened. Thereafter, those balls are each ground up to a target dimension, i.e., product dimension+ marginal dimension, whereby semi-product balls are formed. The marginal dimension includes a marginal dimension necessary for the precise finishing work to gain a target dimension, and further the expansion/compression by the nitriding process.

The quenched stock balls before the nitriding process are greatly large in roundness deviation and diameter difference. Accordingly, a marginal dimension of about several tens 10 μm to several hundreds μm is generally required. Accordingly, if nitride surface layers are formed on the quenched balls, the nitride surface layer is cut nonuniformly, and uneven in thickness. Further, the balance of inner stress of the ball is caused by the nitriding process is lost. As a result, a long time is consumed for the finishing work to gain a required dimension, or a target precision cannot be obtained. Further, this adversely affects the durability of the rolling elements, sometimes.

Those problems are remarkable in the quenched stock balls. When the semi-product balls have unsatisfactory dimensional accuracy, a required dimensional precision cannot be obtained or much time is used for the finishing work. Accordingly, the roundness deviation of the semi-product ball is 3.0 μm or smaller, preferably 1.0 μm or smaller.

The quenched semi-product balls must be tempered. If not tempered, internal residual stress accumulated in the balls will adversely affect the quality of the completed products. For this reason, it is preferable to temper the quenched balls to such an extent as not to lose a required hardness of the substrate. To prevent formation of scratch on the ball surface or to secure a required strength of it, in the process of forming semi-product balls, after a heart treatment, the balls may further be hardened by mechanical hardening process, e.g., barrel or ball peening.

The resultant rolling elements have uniform nitride surface layers being extremely hard, Hv1200 to 1500 and excellent in roughness. Further, the substrate supporting the nitride surface layer is formed to so as to satisfy HRC57 or higher. Accordingly, also when the bearing is operated under large load conditions, the necessary durability is secured.

When the nitride surface layer is too large in thickness, the manufacturing cost is high, and the expansion/compression and deformation of the products are large. Accordingly, finishing cost is also increased. The physical properties of the product is deteriorated. A preferable thickness of the nitride surface layer is 3 μm or larger and 2% Da (2% of the diameter). For this reason, a uniformity thickness of the nitride surface layer is preferably within 5 μm.

Description has been made about the rolling elements of the ball bearing. The same thing is true for the rolling elements (rollers) of other rolling bearings.

DETAILED DESCRIPTION OF THE INVENTION

Figure 1:
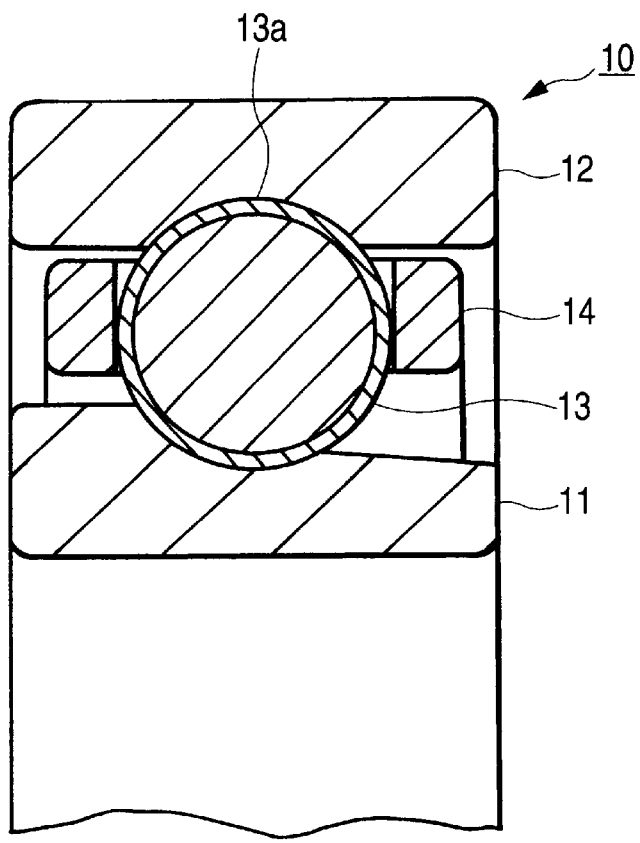
FIG. 1 is a cross sectional view showing an embodiment of the present invention.

The preferred embodiment of the present invention will be described with reference to the accompanying drawings. An angular ball bearing 10 shown in FIG. 1 is constructed with an inner ring 11 having an inner raceway surface, an outer ring 12 having an outer raceway surface, a plurality of balls 13 rotatably disposed between the outer and inner raceway surfaces, and a retainer 14 which holds the balls 13 in a state that the balls are equidistantly disposed in the circumferential direction.

In the embodiment, the invention is implemented into a rolling bearing will be discussed which is assembled into a fly wheel, which is used for the attitude control of a man-made satellite In the embodiment, the inner and outer rings 11 and 12, and the balls 13 are formed of martensitic stainless steel (AISI 440C). A nitride surface layer 13a of Hv 1200 to 1500 is formed over a surface of the balls 13. A longitudinal elastic modulus of AISI 440C is about 200 GPa. A longitudinal elastic modulus of the nitride surface layer 13a is about 240 GPa.

Even if the oil films among the inner and outer rings 11 and 12, and the balls 13 reduce in their thickness with progress of the operation of the angular ball bearing 10, and the surfaces of those are brought into contact with one another, at least the surfaces of the balls 13 are not damaged since the Vickers hardness of those elements are set at 1200 to 1500 (Hv=1200 to 1500). A longitudinal elastic modulus of the nitride surface layer 13a is larger than that of the martensitic stainless steel. Therefore, a contact ellipse is extremely small, and no slip occurs. As a result, there is no chance that a band mark is formed on the ball 13.

EXAMPLE

An angular ball bearing thus constructed was manufactured, (which has specifications of 20 mm in inside diameter, 6 mm in ball diameter, and 12 in the number of balls) The angular ball bearing was rotated under the following conditions:

1) Number of revolutions=4000 min⁻. Pre-load=39.2N
2) Lubricant oil used was 90 cSt at 40° C.
3) The raceways of the inner and outer rings were coated with lubricant oil of 8 mg in total.

The retainer is impregnated with lubricant oil of About 50 mg.

4) Continuously operated for 40 hours.

Figure 2:
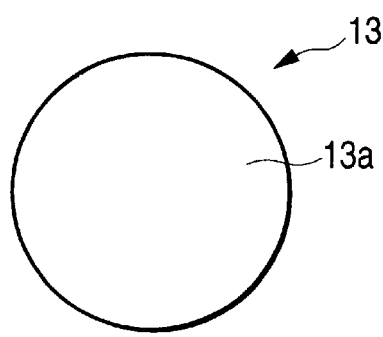
FIG. 2 is a diagram for explaining an example of the invention and a comparison.
Figure 2:
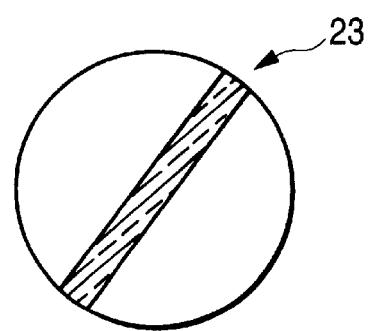

As seen from FIG. 2A, no band mark was found on the surface of the balls 13 after it was rotated. Luster of them was not lost. To compare, a conventional angular ball bearing was rotated under the same conditions. The results are shown FIG. 2B. As seen, a band mark was formed on the surface of a balls 23 after it was rotated.

It should be understood that the present invention is not limited to the embodiment and example as mentioned above, but may variously be modified, altered and changed within the true spirits of the invention. For example, the rolling bearings constructed according to the invention may be combined into a combination bearing. The rolling bearing of the invention may be applied to any other suitable apparatus than the man-made satellite, such as a semiconductor manufacturing equipment requiring low dust generation.

As seen from the foregoing description, the present invention succeeds in providing a rolling bearing for an artificial satellite in which no band mark is formed on the surfaces of the rolling elements, and the luster of the surfaces remains intact.

Note that at least one of the inner and outer rings may have the above-mentioned nitride surface layer.

Also, while there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing in use for a man-made satellite, comprising:
   an inner ring having an inner raceway surface;
   an outer ring having an outer raceway surface; and
   a rolling element rotatably disposed between said outer raceway surface and said inner raceway surface;
   wherein said inner and outer rings, and said rolling element are made of martensitic stainless steel as the parent material, said rolling element includes a nitride surface layer that has a hardness of Hv 1200 to 1500 and a surface roughness of 0.1 $\mu$m Ra or less.

2. The rolling bearing as set forth in claim 1, wherein a thickness of said nitride surface layer is 3 $\mu$m or greater and 2% DA or less, where 2% DA represents 2% of the diameter of the rolling element.

3. The rolling bearing as set forth in claim 2, wherein at least one of said inner and outer raceway surfaces also include said nitride surface layer.

4. The rolling bearing as set forth in claim 1, wherein said martensitic stainless steel consists of AISI 440C, a longitudinal elastic modulus of said AISI 440C is 200 GPa, and a longitudinal elastic modulus of said nitride layer is 240 GPa.

5. The rolling bearing as set forth in claim 4, wherein at least one of said inner and outer raceway surfaces also include said nitride surface layer.

6. The rolling bearing as set forth in claim 1, wherein at least one of said inner and outer raceway surfaces also include said nitride surface layer.

7. The rolling bearing as set forth in claim 1, wherein a uniformity thickness of the nitride surface layer is preferably within 5 $\mu$m.

8. The rolling bearing as set forth in claim 7, wherein at least one of said inner and outer raceway surfaces also include said nitride surface layer.

* * * * *